(12) United States Patent
Florczak (10) Patent No.: US 11,576,346 B2
(45) Date of Patent: Feb. 14, 2023

(54) ANIMAL TAG, METHOD AND COMPUTER PROGRAM FOR DETERMINING BEHAVIOR-RELATED DATA

(71) Applicant: DELAVAL HOLDING AB, Tumba (SE)

(72) Inventor: Keld Florczak, Tumba (SE)

(73) Assignee: DeLaval Holding AB, Tumba (SE)

( * ) Notice: Subject to any disclaimer, the term of this patent is extended or adjusted under 35 U.S.C. 154(b) by 62 days.

(21) Appl. No.: 17/057,186

(22) PCT Filed: May 20, 2019

(86) PCT No.: PCT/SE2019/050458
§ 371 (c)(1),
(2) Date: Nov. 20, 2020

(87) PCT Pub. No.: WO2019/226102
PCT Pub. Date: Nov. 28, 2019

(65) Prior Publication Data
US 2021/0185980 A1     Jun. 24, 2021

(30) Foreign Application Priority Data

May 23, 2018    (SE) .................... 1850607-1

(51) Int. Cl.
*A01K 11/00*     (2006.01)
*A01K 27/00*     (2006.01)
(Continued)

(52) U.S. Cl.
CPC .......... *A01K 11/006* (2013.01); *A01K 11/004* (2013.01); *A01K 27/006* (2013.01);
(Continued)

(58) Field of Classification Search
CPC .. A01K 11/006; A01K 11/004; A01K 27/006; A01K 29/005; H04Q 9/02; H04Q 2209/40
(Continued)

(56) References Cited

U.S. PATENT DOCUMENTS 5,097,706 A    3/1992   Le Nouvel et al.
8,979,757 B2   3/2015   Mottram et al.
(Continued)

FOREIGN PATENT DOCUMENTS

EP      2 510 783      10/2012
WO      2008/124481    10/2008
(Continued)

OTHER PUBLICATIONS

International Search Report for PCT/SE2019/050458 dated Jul. 23, 2019, 4 pages.
(Continued)

*Primary Examiner* — Omar Casillashernandez
(74) *Attorney, Agent, or Firm* — Nixon & Vanderhye (57) ABSTRACT

An animal tag that contains first and second three-dimensional accelerometers and a processing unit, where the first accelerometer registers a first acceleration vector describing a spatial movement of a first position of the animal tag, and the second accelerometer registers a second acceleration vector describing a spatial movement of a second position of the animal tag, the second position separated from the first position by a distance, and the processing unit receives the first and second acceleration vectors and based thereon determines at least one behavior-related parameter for an animal carrying the animal tag in the form of inclination angle(s) ($\psi$, $\Phi$, $\theta$) of the animal tag relative to a reference
(Continued)

frame external to the animal tag, and/or an elevation of the animal tag relative to a reference level external to the animal tag.

16 Claims, 4 Drawing Sheets

(51) Int. Cl.
*A01K 29/00* (2006.01)
*H04Q 9/02* (2006.01)

(52) U.S. Cl.
CPC ............ *A01K 29/005* (2013.01); *H04Q 9/02* (2013.01); *H04Q 2209/40* (2013.01)

(58) Field of Classification Search
USPC .................................................. 340/870.07
See application file for complete search history.

(56) References Cited

U.S. PATENT DOCUMENTS

| | | | | |
|---|---|---|---|---|
| 10,070,626 | B2* | 9/2018 | Rovnyi | G16H 40/67 |
| 2008/0204255 | A1* | 8/2008 | Flexer | A01K 29/00 |
| | | | | 340/573.7 |
| 2010/0261981 | A1* | 10/2010 | Griffioen | A61M 31/00 |
| | | | | 600/301 |
| 2011/0298619 | A1 | 12/2011 | O'Hare et al. | |
| 2015/0097668 | A1* | 4/2015 | Toth | A61B 5/02438 |
| | | | | 600/300 |
| 2015/0237833 | A1* | 8/2015 | Florczak | A01K 29/005 |
| | | | | 340/573.2 |
| 2016/0157788 | A1* | 6/2016 | Yokoo | A61B 5/6819 |
| | | | | 600/549 |
| 2017/0055496 | A1* | 3/2017 | McHugh | A61B 5/024 |
| 2019/0022388 | A1* | 1/2019 | Stucke | A61N 1/0476 |

FOREIGN PATENT DOCUMENTS

| | | |
|---|---|---|
| WO | 2010/066429 | 6/2010 |
| WO | 2010/108496 | 9/2010 |
| WO | 2013/005038 | 1/2013 |
| WO | 2015/041548 | 3/2015 |

OTHER PUBLICATIONS

Written Opinion of the ISA for PCT/SE2019/050458 dated Jul. 23, 2019, 6 pages.
Search Report for SE 1850607-1 dated Dec. 19, 2018, 3 pages.

* cited by examiner

ANIMAL TAG, METHOD AND COMPUTER PROGRAM FOR DETERMINING BEHAVIOR-RELATED DATA

This application is the U.S. national phase of International Application No. PCT/SE2019/050458 filed May 20, 2019 which designated the U.S. and claims priority to SE Patent Application No. 1850607-1 filed May 23, 2018, the entire contents of each of which are hereby incorporated by reference.

TECHNICAL FIELD

The present invention relates generally to registering of animal behavior data. More particularly the invention relates to an animal tag and method of determining behavior-related data. The invention also relates to a computer program and a non-volatile data carrier.

BACKGROUND

For animal-health reasons and to maintain high quality and efficiency in animal-based food production it is important that the physical status of livestock animals can be monitored in a convenient and reliable manner. To this aim, the identification tags are now being equipped with sensors that are becoming more and more resourceful for each new generation.

EP 2 510 783 describes one example of a method for monitoring the movements of an animal. Here, the animal is provided with a device having sensor means for detecting movements, and generating at least a signal with information about detected movements of the animal. The device is further provided with a control unit for processing the information in the signal and for storing the processed information and transmitter means for transmitting information stored in the control unit. The method involves: storing in the control unit a number of predetermined-type movements counted during a predetermined set of periods which comprises a number of successive first periods, and transmitting a number of the stored numbers of counted movements at moments which depend on the number of detected predetermined-type movements in at least one of the past first periods and/or depend on at least one of the stored orientations of the sensor means. The sensor means are implemented as a G-sensor capable of measuring accelerations in three dimensions and measuring the orientation of the sensor with respect to the earth's surface.

Traditionally, measuring orientation parameters requires gyroscopic sensors, which are comparatively energy demanding. Considering the size and operation life-span requirements of animal tags, it is challenging to integrate orientation sensors in animal tags.

SUMMARY

The object of the present invention is to offer a solution for providing orientation based animal-behavior data without requiring gyroscopic sensors.

According to one aspect of the invention, the object is achieved by an animal tag that contains first and second three-dimensional accelerometers configured to register first and second acceleration vectors respectively. The first acceleration vector describes a spatial movement of a first position of the animal tag, and the second acceleration vector describes a spatial movement of a second position of the animal tag, which second position is separated from the first position by a distance. According to embodiments of the invention, the first and second three-dimensional accelerometers are arranged at opposite ends of a space diagonal through the animal tag, and/or the distance between the first and second positions is at least 20 mm, and preferably at least 40 mm. The processing unit in the tag is configured to receive the first and second acceleration vectors, and based thereon determine at least one behavior-related parameter for an animal carrying the animal tag. More precisely, the processing unit is configured to determine at least one inclination angle of the animal tag relative to a reference frame external to the animal tag and/or an elevation of the animal tag relative to a reference level external to the animal tag.

This animal tag is advantageous because it provides reliable detection of angular and/or altitude changes exclusively based on accelerometer data. Since accelerometers have relatively low power consumption, especially compared to gyroscopic sensors, the invention enables energy-efficient detection of complex motion patterns.

According to one embodiment of this aspect of the invention, the processing unit is further configured to determine whether the animal is standing up or lying down based on the first and second acceleration vectors. Moreover, the processing unit is configured to include a posture indicator in the at least one behavior-related parameter, which posture indicator reflects whether the animal is standing up or lying down. Hence, highly relevant behavior data can be provided in a straightforward manner.

Preferably, the processing unit is also configured to register standing times and lying times for the animal, and/or include the standing times and/or lying times respectively in the behavior-related parameter. In other words, these behaviors can both be correlated with time instances and durations.

According to another embodiment of this aspect of the invention, the animal tag contains a data storage unit. The processing unit is further configured to assign a respective time stamp to the behavior-related parameters and store the behavior-related parameters together with said respective time stamps assigned thereto in the data storage unit. Consequently, the behavior-related parameters can be temporarily stored in the tag unit before being transferred to external processing and/or analysis.

According to yet another embodiment of this aspect of the invention, the animal tag also includes a wireless interface configured to emit a wireless signal containing at least one of the at least one behavior-related parameter. Thus, these data can be transferred to external processing and/or analysis in a very convenient manner.

According to still another embodiment of this aspect of the invention, the processing unit is configured to cause identification data to be included in the wireless signal. The identification data, in turn, is adapted to enable receivers of the wireless signal to determine an identity of the animal tag. Hence, the animal tag can be remotely identified. Furthermore, the animal tag's position can be determined by a base station system.

According to embodiments of this aspect of the invention, the animal tag is configured to be attached to a neckband and/or an ear on the animal. Thereby, flexibility is provided with respect to how the tag is positioned on the animal.

According to another aspect of the invention, the object is achieved by a method to be implemented in an animal tag to determine behavior-related data concerning an animal to which the animal tag is attached. The method involves registering a first acceleration vector via a first three-dimensional accelerometer. The first acceleration vector describes a spatial movement of a first position of the animal tag. At least one behavior-related parameter is then determined based on the first acceleration vector. The method involves registering a second acceleration vector via a second three-dimensional accelerometer. The second acceleration vector describes a spatial movement of a second position of the animal tag. The second position is separated from the first position by a distance. Based on the first and second acceleration vectors, the at least one behavior-related parameter is determined in the form of: at least one inclination angle of the animal tag relative to a reference frame external to the animal tag and/or an elevation of the animal tag relative to a reference level external to the animal tag.

The advantages of this method, as well as the preferred embodiments thereof, are apparent from the discussion above with reference to the control unit.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
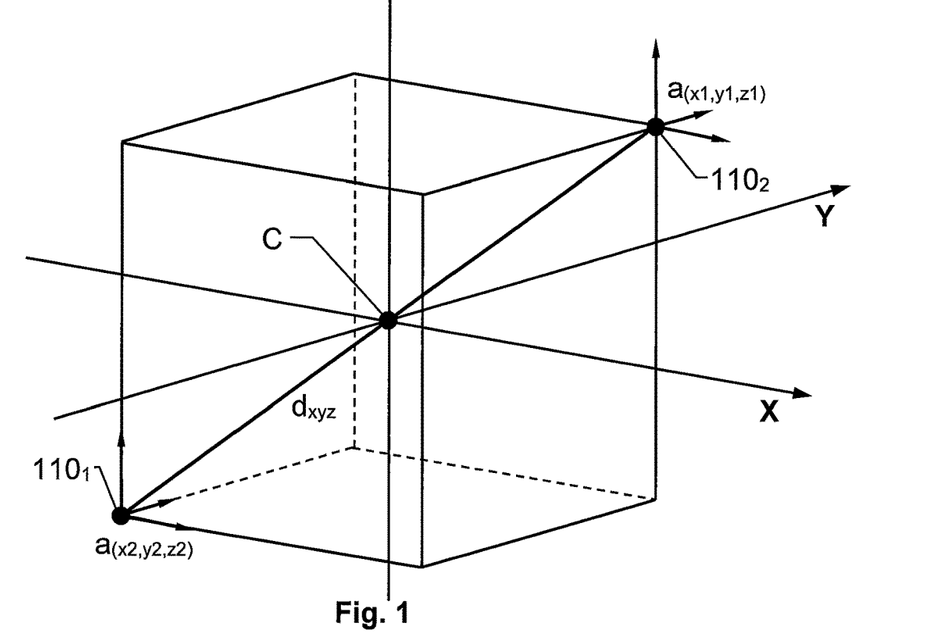
FIG. 1 shows a cube schematically illustrating how two accelerometers are physically separated from one another by a distance.

FIG. 1 shows a cube schematically illustrating how two accelerometers $110_1$ and $110_2$ respectively are physically separated from one another by a distance $d_{xyz}$. The first accelerometer $110_1$ is located at a first position [x1, y1, z1] and the second accelerometer $110_2$ is located at a second position [x2, y2, z2], and the distance $d_{xyz}$ between the accelerometers is represented by a vector from the first position [x1, y1, z1] to the second position [x2, y2, z2]. For precision reasons it is preferred that the first and second accelerometers $110_1$ and $110_2$ are separated as much as possible from one another in the animal tag, e.g. being located at opposite ends of a space diagonal as shown in FIG. 1. In other words, the first and second three-dimensional accelerometers $110_1$ and $110_2$ respectively are preferably arranged as far as possible from one another given the physical limitations of the animal tag 100.

Figure 2:
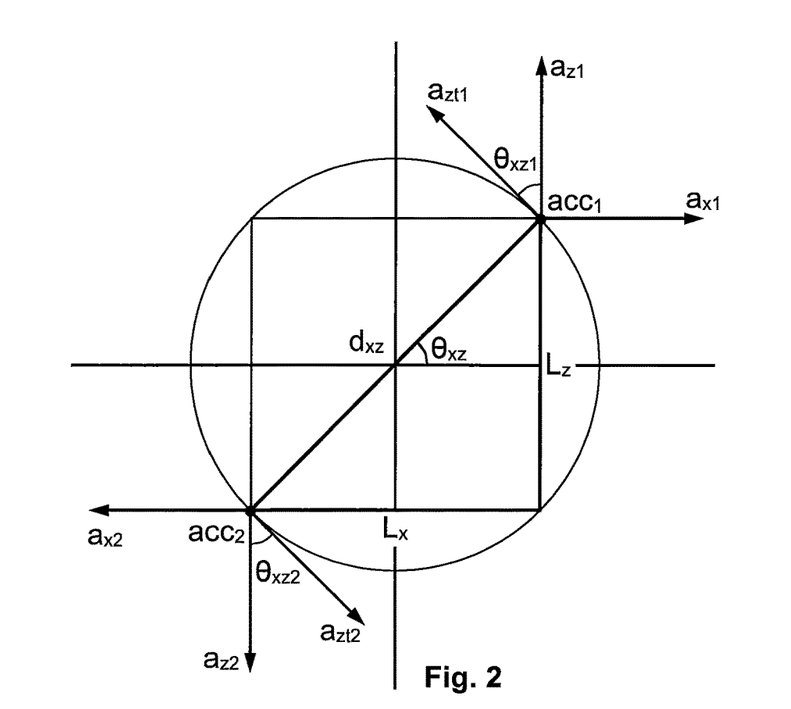
FIG. 2 represents a bounding cylinder in a plane projection of the cube in FIG. 1.

In FIG. 2, we see a bounding cylinder representing a projection of the cube in FIG. 1 in the XZ-plane.

The basic working principle behind an algorithm for computing inclination angles based on acceleration measurements is that each of the two corner accelerometers $110_1$ and $110_2$ in FIG. 1 experiences an acceleration consisting of a translational component $\bar{a}$ and rotational component $a_d$. The total acceleration of each accelerometer can therefore be expressed as follows:

$110_1$: $a_{x1}=\bar{a}_x+a_{dx}$, $a_{y1}=\bar{a}_y+a_{dy}$, $a_{z1}=\bar{a}_z+a_{dz}$ $110_2$: $a_{x2}=\bar{a}_x+a_{dx}$, $a_{y2}=\bar{a}_y+a_{dy}$, $a_{z2}=\bar{a}_z+a_{dz}$ Per definition, a center point C of the cube does not experience any acceleration contribution from rotation. This means that the center point C only experiences acceleration from translation. The center point C translation can be calculated by determining an average $\bar{a}_{xyz}$ of the first and second accelerometers $110_1$ and $110_2$ according to the below:

$$\bar{a}_{x,y,z} = \left(\frac{a_{x1}+a_{x2}}{2}, \frac{a_{y1}+a_{y2}}{2}, \frac{a_{z1}+a_{z2}}{2}\right).$$

Further, the angular acceleration about the X, Y and Z-axes can be found by creating respective enclosing cylinders around the XY, YZ and XZ projections of the bounding cube. In FIG. 2, we see one such example in the form of the enclosing cylinder in the XZ-projection plane.

The diameter of each of said bounding cylinders is given by the Pythagorean Theorem as:

$$d_{xy,yz,xz}=(\sqrt{L_x^2+L_y^2}, \sqrt{L_y^2+L_z^2}, \sqrt{L_x^2+L_z^2})$$

The tangential acceleration can then be found by decomposing the acceleration vector along the circumference of the enclosing cylinder, as illustrated by the $a_{zt1}$ and $a_{zt2}$ vectors in FIG. 2. A respective acceleration axis is here assigned to each enclosing cylinder.

In particular, the X-axis can be used for the XY-plane, the Y-axis for the YZ-plane and the Z-axis for the XZ-plane. However, since two acceleration vectors are available for each projection, other combinations are, of course, also possible. The tangential angle for each axis is determined from the shape of the plane projection, and is calculated by using the below expression:

$$\theta_{xy,yz,xz} = \left(\arcsin\left(\frac{L_x}{d_{xy}}\right), \arcsin\left(\frac{L_x}{d_{yz}}\right), \arcsin\left(\frac{L_z}{d_{xz}}\right)\right)$$

The tangential acceleration for the XY, YZ and XZ-plane can then be calculated using the below equations:

XY: $a_{xyt1}=a_{x1}\cos(\theta_{xy})$, $a_{xyt2}=a_{x1}\cos(\theta_{xy})$

YZ: $a_{yzt1}=a_{y1}\cos(\theta_{yz})$, $a_{yzt2}=a_{y2}\cos(\theta_{yz})$

XZ: $a_{xzt1}=a_{z1}\cos(\theta_{xz})$, $a_{xyt2}=a_{z2}\cos(\theta_{xz})$

The linear acceleration resulting from the rotation then becomes the difference between the two tangential accelerations, as expressed below:

$$a_{d_{xy}} = \frac{a_{xyt1}-a_{xyt2}}{2}$$

$$a_{d_{yz}} = \frac{a_{yzt1} - a_{yzt2}}{2}$$

$$a_{d_{xz}} = \frac{a_{xzt1} - a_{xzt2}}{2}$$

The angular acceleration is the linear acceleration normalized to unit radius. In this case, the length of the radius is equal to half the diameter of each bounding cylinder. The angular acceleration about the X, Y and Z-axis is therefore given by:

$$\alpha_{zxy} = \left( \frac{2a_{d_{xy}}}{d_{xy}}, \frac{2a_{d_{yz}}}{d_{yz}}, \frac{2a_{d_{xz}}}{d_{xz}} \right)$$

By integrating the angular acceleration with respect to time, and assuming zero initial velocity, an angular velocity ω equivalent to what a gyroscope provides can be obtained according to the below:

$$\omega_{zxy}(t) = \omega_{zxy}(t-\Delta t) + \Delta t \alpha_{zxy}(t)$$

The angular velocity ω can be integrated once more to provide a set of angles of orientation ψ(t), θ(t) and ϕ(t) respectively, which may also be referred to as roll ψ(t), pitch θ(t) and yaw ϕ(t):

$$\psi(t) = \psi i(t-\Delta t) + \Delta t \omega_x(t)$$

$$\theta(t) = \theta(t-\Delta t) + \Delta t \omega_y(t)$$

$$\theta(t) = \theta(t-\Delta t) + \Delta t \omega_z(t)$$

To summarize, the above equations require two integration steps to compute an angle of rotation. However, since a gyroscope by default outputs angular velocity, the conventional gyro-based technology requires only one integration step.

Figure 3:
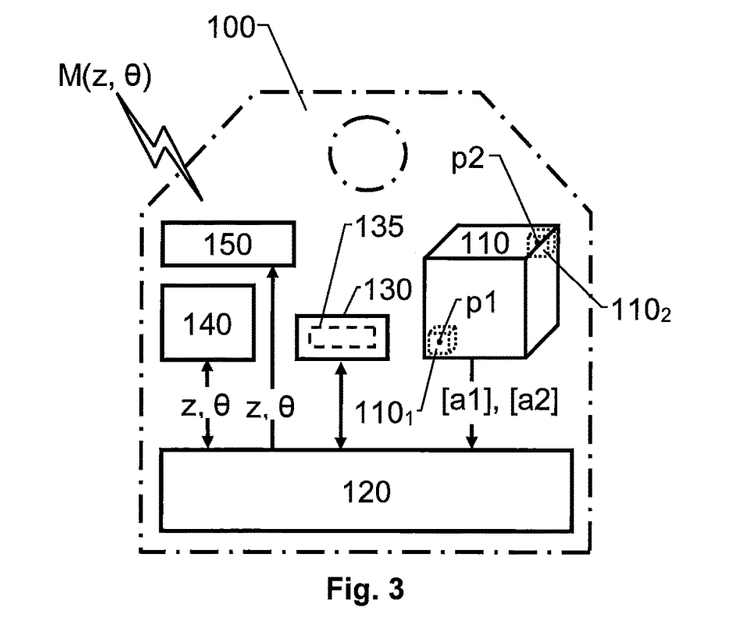
FIG. 3 shows a block diagram over an animal tag according to one embodiment of the invention.

Turning now to FIG. 3, we see a block diagram over an animal tag 100 according to one embodiment of the invention. The animal tag 100 contains an accelerometer unit 110 and a processing unit 120.

The accelerometer unit 110, in turn, includes first and second three-dimensional accelerometers $110_1$ and $110_2$ respectively.

The first three-dimensional accelerometer $110_1$ is configured to register a first acceleration vector [a1] describing a spatial movement of a first position p1 of the animal tag 100.

The processing unit 120 is configured to receive the first acceleration vector [a1], and based thereon determine at least one behavior-related parameter for an animal A that carries the animal tag 100. According to the invention, however, the at least one behavior-related parameter is not determined on the first acceleration vector [a1] alone.

Namely, the second three-dimensional accelerometer $110_2$ is configured to register a second acceleration vector [a2] describing a spatial movement of a second position p2 of the animal tag 100, which second position p2 is separated from the first position P1 by a distance $d_{xyz}$ as described above with reference to FIG. 1. For acceptable accuracy, the distance $d_{xyz}$ is at least 20 mm, and more preferably the distance $d_{xyz}$ is at least 40 mm. If possible, considering other design criteria, it is advantageous if the first and second positions p1 and p2 can be maximally separated from one another within the boundaries set by the physical outline of the animal tag 100. Namely, as a general rule of principle, the larger the distance $d_{xyz}$, the higher the accuracy—for a given quality of the accelerometers $110_1$ and $110_2$ and a specific capacity of the processing unit 120. To limit the error propagation, it is further advantageous if every inclination angle that is calculated to be below a threshold value is rounded off to zero.

The processing unit 120 is further configured to receive the second acceleration vector [a2], and based on the first and second acceleration vectors [a1] and [a2], the processing unit 120 is configured to determine the at least one behavior-related parameter. The at least one behavior-related parameter is here determined in the form of: at least one inclination angle ψ, θ and ϕ of the animal tag 100 relative to a reference frame XYZ external to the animal tag 100, and/or an elevation z of the animal tag 100 relative to a reference level XY external to the animal tag 100. This will be described in further detail below referring to FIG. 6.

According to one embodiment of the invention, the processing unit 120 is further configured to determine whether the animal A is standing up or lying down based on the first and second acceleration vectors [a1] and [a2] respectively. Moreover, the processing unit 120 is configured to include a posture indicator in the at least one behavior-related parameter. The posture indicator may be a binary symbol reflecting whether the animal A is standing up or lying down, for example via a "1" and "0" respectively.

Preferably, the processing unit 120 is also configured to register the standing times and/or lying times for the animal A, and include the standing times and/or lying times in the at least one behavior-related parameter. Hence, the at least one behavior-related parameter may be expressed as:

{t1 to t2<standing up>; t2 to t3<lying down>; t4 to t5<standing up>}.

In addition, or as an alternative, the animal tag 100 may contain a data storage unit 140 and the processing unit 120 may be configured to assign a respective time stamp to at least one of the at least one behavior-related parameter. The processing unit 120 is further configured to store the at least one behavior-related parameter together with the respective time stamps assigned thereto in the data storage unit 140. Consequently, the following data string can be stored in the data storage unit 140:

{t1: <standing up>; t2: <standing up>; t3: <standing up>; t4: <standing up>; t5: <standing up>; t6: <standing up>; t7: <lying down>; t8: <lying down>; t9: <lying down>; t10: <lying down>; t11: <lying down>; t12: <standing up>; t13: <standing up>}; t14: <standing up>}

To allow convenient readout of the at least one behavior-related parameter registered by the animal tag A, a wireless interface 150 may be included. The wireless interface 150 is configured to emit a wireless signal M(z, θ) containing at least one of the at least one behavior-related parameter, i.e. for example the above data string.

Preferably, the wireless signal M(z, θ) contains identification data adapted to enable receivers of the wireless signal M(z, θ) to determine an identity of the animal tag 100. Therefore, to this aim, according to one embodiment of the invention, the processing unit 120 is configured to cause such identification data to be included in the wireless signal M(z, θ). Hence, the wireless signal M(z, θ) may have the following general structure:

ID[A]: {t1 to t2<standing up>; t2 to t3<lying down>; t4 to t5<standing up>}.

Figure 4:
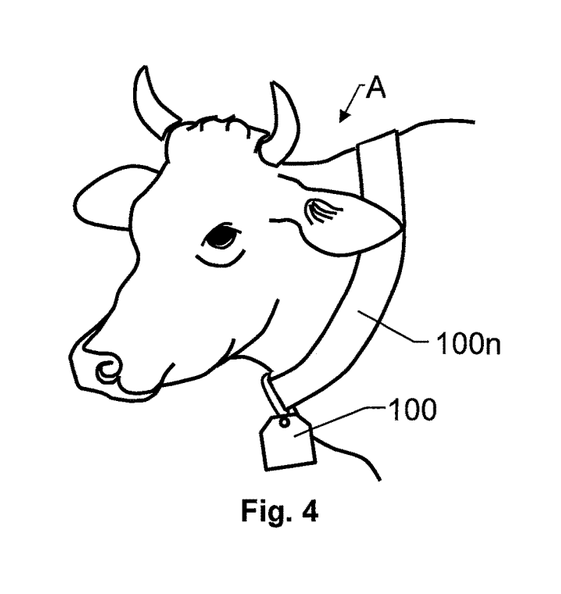
FIG. 4 shows a first example of how the proposed tag can be attached to a neckband on an animal.
Figure 5:
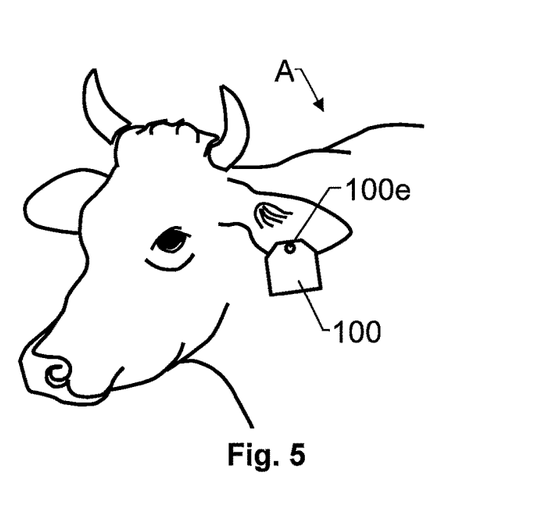
FIG. 5 shows a second example of how the proposed tag can be arranged in the ear of an animal.

FIGS. 4 and 5 show first and second examples of how the proposed animal tag 100 can be attached on an animal A. In the first example shown in FIG. 4, the animal tag 100 is arranged in a neckband 100n worn by the animal A. Such an arrangement of the animal tag 100 is advantageous because it facilitates attaching and exchanging the tag. In the second example shown in FIG. 5, the animal tag 100 is instead attached directly to the animal's A ear via a piercing shaft. This is beneficial, since it ensures a fix and distinct location of the tag on the animal A.

Figure 6:
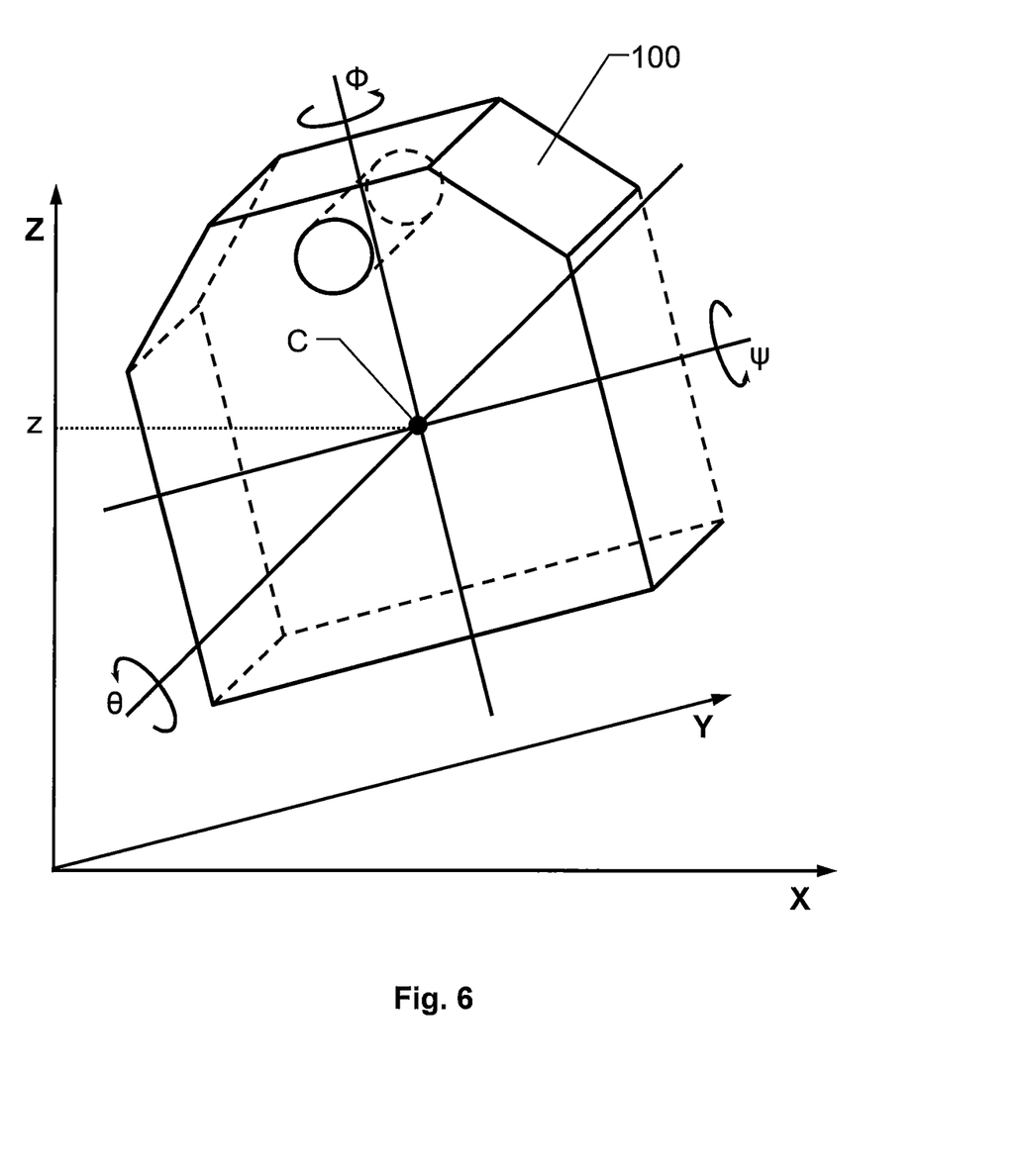
FIG. 6 illustrates a set of inclination angles with respect to the proposed animal tag.

FIG. 6 illustrates a set of inclination angles $\psi$, $\theta$ and $\phi$ with respect to the animal tag A. Here, a first inclination angle $\psi$ represents a roll of the tag; a second inclination angle $\theta$ represents a pitch of the tag and a third inclination angle $\phi$ represents a yaw of the tag.

In FIG. 6, an elevation z of the animal tag 100 is indicated relative to a reference level external to the animal tag 100. Since, in this example, the elevation z represents an altitude parameter, an XY-plane parallel to the sea level constitutes the reference level. The processing unit 120 is configured to determine the elevation z by double-integrating the acceleration registered by at least one of the accelerometers 110₁ and 110₂ with respect to time while keeping track of the inclination angles $\psi$, $\theta$ and $\phi$, so that said double-integration is made consistently in a dimension being orthogonal to the XY-plane.

Returning now to FIG. 3, we note that it is generally advantageous if the processing unit 120 is configured to effect the above-mentioned procedure in an automatic manner by executing a computer program 135. Therefore, the processing unit 120 may include a memory unit, i.e. non-volatile data carrier 130, storing the computer program 135, which, in turn, contains software for making processing circuitry in the form of at least one processor in the processing unit 120 execute the above-described actions when the computer program 135 is run on the at least one processor.

Figure 7:
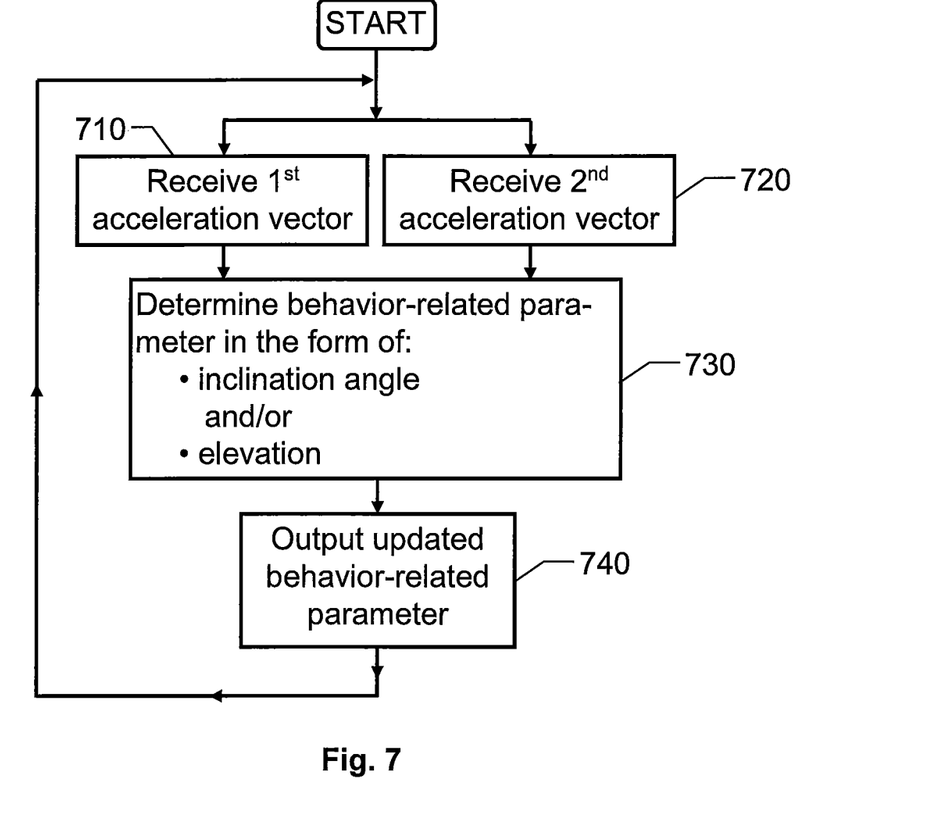
FIG. 7 illustrates, by means of a flow diagram, the general method of determining behavior-related data according to the invention.

In order to sum up, and with reference to the flow diagram in FIG. 7, we will now describe the general method according to the invention for determining behavior-related data concerning an animal to which the proposed tag is attached.

In a first step 710, a first acceleration vector [a1] is received from a first three-dimensional accelerometer 110₁. In parallel with step 710, in a step 720, a second acceleration vector [a2] is received from a second three-dimensional accelerometer 110₂. The first three-dimensional accelerometer 110₁ describes the acceleration of a first position p1 of the animal tag and the second three-dimensional accelerometer 110₂ describes the acceleration of a second position p2 of the animal tag. The second position p2 is separated from the first position by a distance $d_{xyz}$.

In a step 730 following steps 710 and 720, at least one behavior-related parameter is determined, which concerns an animal A that carries the animal tag 100. The at least one behavior-related parameter is expressed as at least one inclination angle $\psi$, $\theta$ and $\phi$ relative to a reference frame XYZ external to the animal tag, and/or an elevation z of the animal tag relative to a reference level XY external to the animal tag.

Subsequently, the at least one behavior-related parameter is output in a step 740. Thereafter, the procedure loops back to steps 710 and 720.

All of the process steps, as well as any sub-sequence of steps, described with reference to FIG. 7 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal, which may be conveyed via electrical or optical cable or by, radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is primarily intended to determining behavior-related data in respect of milk-producing animals, e.g. cows, the proposed solution is equally well applicable for any other kind of livestock or wild animals.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An animal tag (100), comprising:
a first three-dimensional accelerometer (110₁) configured to register a first acceleration vector ([a1]) describing a spatial movement of a first position (p1) of the animal tag (100);
a processing unit (120); and
a second three-dimensional accelerometer (110₂) configured to register a second acceleration vector ([a2]) describing a spatial movement of a second position (p2) of the animal tag (100), said second position (p2) separated from the first position (P1) by a distance ($d_{xyz}$),
the processing unit (120) configured to receive the first and second acceleration vectors ([a1]; [a2]), and based on both of said first and second acceleration vectors ([a1]; [a2]) calculate at least one behavior-related parameter for an animal (A) carrying the animal tag (100), the at least one behavior-related parameter comprising at least one of:
at least one inclination angle ($\psi$, $\Phi$, $\theta$) of the animal tag (100) relative to a reference frame (XYZ) external to the animal tag (100), and
an elevation (z) of the animal tag (100) relative to a reference level (XY) external to the animal tag (100),
wherein said calculation of the at least one behavior-related parameter is made from angular and altitude changes in the animal tag (100) exclusively based on accelerometer data from said first and second acceleration vectors ([a1]; [a2]) from the first and second three-dimensional accelerometers (110₁, 100₂), wherein the processing unit (120) is further configured, based on both the first and second acceleration vectors ([a1], [a2]), to determine whether the animal (A) is either standing up or lying down, said determined at least one behavior-related parameter including a posture indicator that reflects whether the animal (A) is either standing up or lying down.

2. The animal tag (100) according to claim 1, wherein the processing unit (120) is further configured to:
register at least one of standing times and lying times for the animal (A); and
include the at least one of standing times and lying times in the at least one behavior-related parameter.

3. The animal tag (100) according to claim 1, further comprising:
a data storage unit (140), and
wherein the processing unit (120) is further configured to:
assign a time stamp to at least one of the at least one behavior-related parameter, and
store the at least one behavior-related parameter together with the time stamp assigned thereto in the data storage unit (140).

4. The animal tag (100) according to claim 1, further comprising:
a wireless interface (150) configured to emit a wireless signal (M(z, θ)) containing the at least one behavior-related parameter.

5. The animal tag (100) according to claim 4, wherein the processing unit (120) is configured to cause identification data to be included in the wireless signal (M(z, θ)), said identification data adapted to enable a receiver of the wireless signal (M(z, θ)) to determine an identity of the animal tag (100).

6. The animal tag (100) according to claim 1, wherein the animal tag (100) is configured to be attached to at least one of a neckband (100*n*) and an ear (100*e*) on the animal (A).

7. The animal tag (100) according to claim 1, wherein the distance ($d_{xyz}$) between the first and second positions (p1; p2) is at least 20 mm.

8. The animal tag (100) according to claim 1, wherein the first and second three-dimensional accelerometers (110$_1$; 110$_2$) are arranged at opposite ends of a space diagonal through the animal tag (100).

9. A method to be implemented in an animal tag (100) to determine at least one behavior-related parameter concerning an animal (A) carrying the animal tag (100), the method comprising:
registering a first acceleration vector ([a1]) via a first three-dimensional accelerometer (110$_1$), the first acceleration vector ([a1]) describing a spatial movement of a first position (p1) of the animal tag (100);
registering a second acceleration vector ([a2]) via a second three-dimensional accelerometer (110$_2$), the second acceleration vector ([a2]) describing a spatial movement of a second position (p2) of the animal tag (100), the second position (p2) being separated from the first position by a distance ($d_{xyz}$);
calculating, from both the first and second acceleration vectors ([a1]; [a2]), at least one behavior-related parameter in the form of at least one of:
at least one inclination angle (ψ, Φ, θ) of the animal tag (100) relative to a reference frame (XYZ) external to the animal tag (100), and
an elevation (z) of the animal tag (100) relative to a reference level (XY) external to the animal tag (100),
wherein said calculation of the at least one behavior-related parameter is made from angular and altitude changes in the animal tag (100) exclusively based on accelerometer data from said first and second acceleration vectors ([a1]; [a2]) from the first and second three-dimensional accelerometers (110$_1$, 100$_2$); and
determining, based on both the first and second acceleration vectors ([a1], [a2]), whether the animal (A) is either standing up or lying down, including determining a posture indicator in the at least one behavior-related parameter, said posture indicator reflecting whether the animal (A) is either standing up or lying down.

10. The method according to claim 9, further comprising:
registering at least one of standing times and lying times for the animal (A); and
including the at least one of standing times and lying times in the at least one behavior-related parameter.

11. The method according to claim 9, further comprising:
assigning a time stamp to the at least one behavior-related parameter; and
storing the at least one behavior-related parameter together with the time stamp assigned thereto in a data storage unit (140) in the animal tag (100).

12. The method according to claim 9, further comprising:
emitting a wireless signal (M(z, θ)) containing the at least one behavior-related parameter via a wireless interface (150).

13. The method according to claim 12, further comprising:
including identification data in the wireless signal (M(z, θ)) adapted to enable a receiver of the wireless signal (M(z, θ)) to determine an identity of the animal tag (100).

14. The method according to claim 9, wherein the distance ($d_{xyz}$) between the first and second positions (p1; p2) is at least 20 mm.

15. The method according to claim 9, wherein the first and second three-dimensional accelerometers (110$_1$; 110$_2$) are arranged at opposite ends of a space diagonal through the animal tag (100).

16. A computer program (135) recorded on a non-volatile data carrier (130), the computer program (135) comprising software readable by a processing unit (120) and that causes the processing unit to execute the method according to claim 10 when the computer program (135) is run by the processing unit (120).

* * * * *